UNITED STATES PATENT OFFICE.

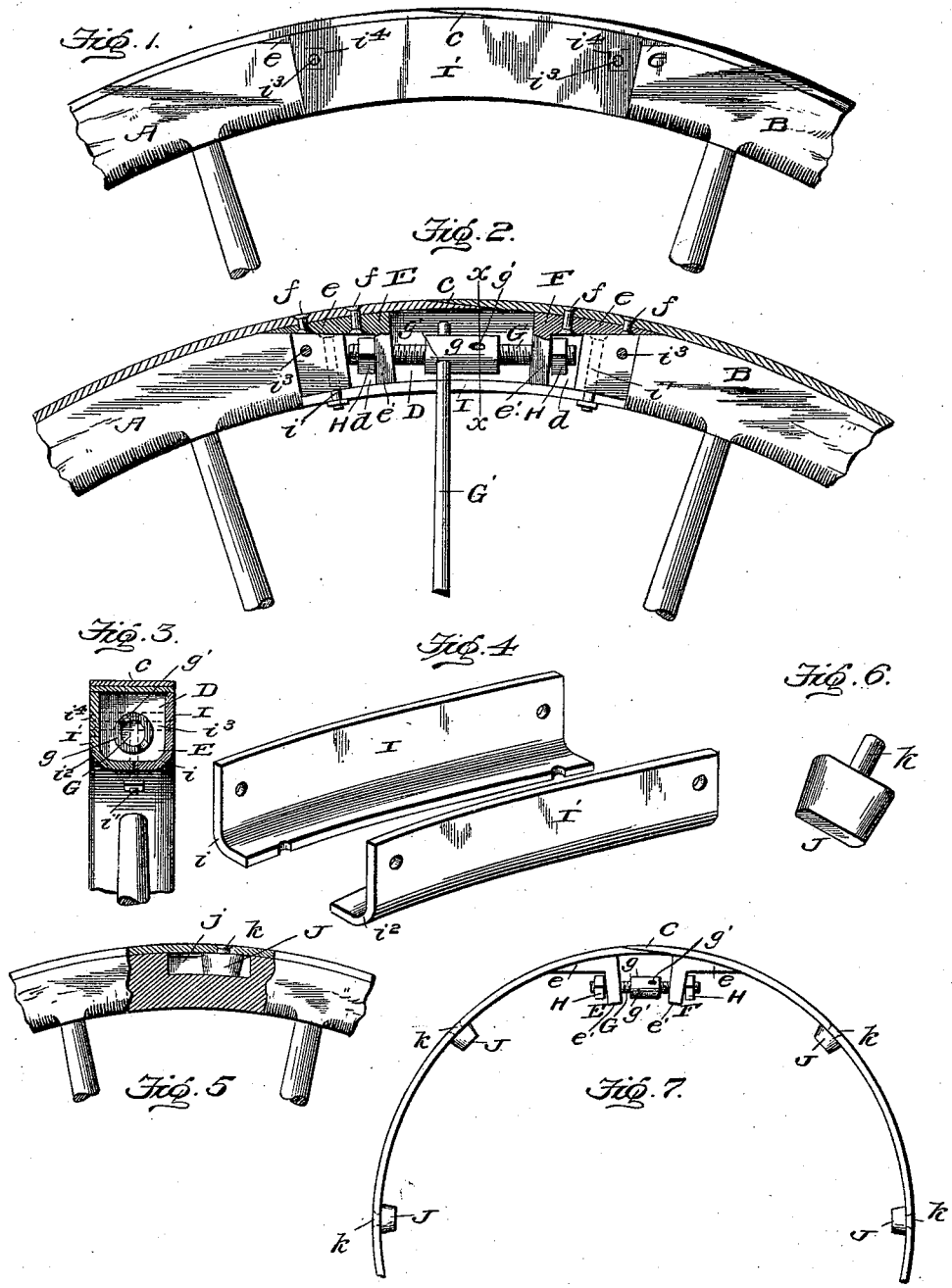

MARTIN L. HOWARD AND GRANT J. GRANDPRE, OF OACOMA, SOUTH DAKOTA.

TIRE-TIGHTENER.

SPECIFICATION forming part of Letters Patent No. 536,349, dated March 26, 1895.

Application filed October 22, 1894. Serial No. 526,618. (No model.)

*To all whom it may concern:*

Be it known that we, MARTIN L. HOWARD and GRANT J. GRANDPRE, citizens of the United States, residing at Oacoma, in the county of Lyman and State of South Dakota, have invented certain new and useful Improvements in Tire-Tighteners; and we do hereby declare the following to be a full, clear, and exact description of the invention, such as will enable others skilled in the art to which it appertains to make and use the same.

Our invention relates to improvements in tire tighteners, and the object we have in view is to provide a simple strong and inexpensive construction which can be easily and quickly adjusted to take up the slack in a wheel tire and which is housed against accumulation of dirt within a boxing set in flush with the fellies and constructed to permit of ready access to the adjusting bolt.

With these ends in view, our invention consists in the combination with the fellies spaced to accommodate the adjusting mechanism, and a tire which has its meeting ends beveled reversely to overlap one another by a bevel lap joint over the spaced fellies, of angle irons riveted or otherwise rigidly united near the respective beveled ends of the tire and provided with oppositely threaded sockets which are in line with each other, a right and left threaded adjusting bolt fitted in the threaded sockets of the respective angle irons and having a headed perforated central portion to receive an adjusting pin or rod, and a boxing having two plates set in flush with the fellies across the spaced part thereof and extended at their lower edges around flush with the inside of the fellies, one side plate being permanently united to the fellies by through bolts and the other side plate being detachably united to the fellies by independent transverse bolts which have their nuts set flush with the outside of the removable side plate.

Our invention further consists in the combination with the fellies and tire, of the angle irons united to the tire and arranged within the ends of the fellies to leave spaces between the angle irons and said ends of the fellies, the threaded bolt having its ends extended through the tapped sockets in the angle irons and terminating within the spaces between the fellies and the angle irons, and set nuts fitted on the extended ends of said bolts,within the spaces between the angle irons and fellies, and bearing against said angle irons, whereby the set nuts not only prevent the bolt from turning but they reinforce the bolt and its threads and prevent stripping of the threads from the bolt.

Our invention further consists in the combination with a tire, of a felly having an elongated recess or groove cut in the perimeter thereof next to the tire, and a key which is made to snugly fit the elongated recesss transversely thereof but which is of less length than the recess, said key having a shank which is riveted from the outside against the tire, whereby the tire and felly are joined together by a key which permits the tire to be adjusted longitudinally by the threaded bolt and take up the slack in said tire, without straining the unions or couplings between the tire and felly; and the invention further consists in the novel construction and combination of parts which will be hereinafter more fully described and claimed.

To enable others to understand our invention, we have illustrated the same in the accompanying drawings, forming a part of this specification, and in which—

Figure 1 is a side elevation of a portion of a wheel equipped with our improved tire tightener. Fig. 2 is a longitudinal sectional view thereof. Fig. 3 is a vertical transverse sectional view on the line $x$—$x$ of Fig. 2. Fig. 4 is a detail view of the plates forming the boxing or housing for the adjusting devices. Fig. 5 is a view, partly in elevation and partly in section, of a portion of the wheel showing the improved key connection between the tire and felly. Fig. 6 is a detail perspective view of the key, and Fig. 7 is an elevation of a part of the tire removed from the fellies.

Like letters of reference denote corresponding parts in all the figures of the drawings, referring to which—

A, B, designate the fellies of the wheel, and C is the tire. The ends of the tire are beveled reversely to each other and are adjusted to overlap one another, thus forming the bevel lap joint, c, which enables the tire to be contracted and drawn together without permitting a space to occur between said ends of the tire or of producing unsightly and projecting ends of the tire at the joint. Opposite to this beveled lap joint c in the tire, the adjacent ends of the contiguous fellies A, B, are separated to produce the space D in which are fitted the adjusting appliances for taking up the slack in the tire. These adjusting devices consist of the angle irons E, F, and the threaded bolt G. The angle irons are each made with a tapering shank $e$ and a head $e'$ at right angles to the shank, and said irons E, F, are applied against the inside faces of the tire, near the lapped ends thereof, and so that the pendent heads $e'$ are opposite to each other, with a sufficient space between to accommodate the threaded bolt. The tapered shanks of the angle irons, which are preferably made of malleable iron castings, are rigidly united to the respective ends of the tire by the rivets $f$. The heads $e'$ of the angle irons do not contact with or bear against the ends of the fellies A, B, but they are arranged short distances within said fellies to leave the spaces $d, d$; and in said heads $e', e'$ of the angle irons are tapped right and left hand threaded openings to receive the correspondingly threaded ends of the adjusting bolts G. These threaded ends of the bolt are extended through the heads of the angle irons, into the spaces $d$ between the angle irons and ends of the fellies, and on these extended ends of the bolt are fitted the set nuts H, H, which bear against the heads $e', e'$, of the angle irons and serve to relieve, to a considerable extent, the strain on the bolt and to prevent the threads from being stripped off the bolt. The adjusting bolt is provided at its center with an enlarged head, $g$, and through this head are formed two intersecting passages $g'$ which give four points of entrance to the pin or rod G' which is used to turn the bolt G and draw the angle irons toward each other in order to contract the tire and tighten it around the fellies of the wheel.

The boxing or housing consists of the two plates I, I', each of which is made of a single piece of metal and shaped to fit close up against the tire C and around the inside of the fellies A, B, across the space D, so as to be continuous with the fellies and thus make the wheel present an unbroken appearance. The plate I is fitted in recesses in the fellies and has its lower edge curved or rounded at $i$ to extend part way around and continuous with the inner side of the fellies; and this plate is fixed permanently to the fellies by means of the bolts $i'$ which pass through the ends of the fellies and the edge $i$ of the plate I. The other plate I' fits close up against the tire, near its other edge, and the lower edge of said plate I' is curved at $i^2$ to fit close up against and flush with the lower curved edge $i$ of the other plate I; and said plate I' is removably held in place by the transverse bolts $i^3$ which pass horizontally through the two plates I, I', and the ends of the fellies, the nuts $i^4$ of the bolts $i^3$ being fitted in countersunk recesses in the plate I' so as to be practically flush therewith, whereby the plate I' can be removed to permit of ready access to the adjusting bolt G.

In lieu of uniting the tire and fellies together by the usual tire bolts which pass through the fellies and the tire, we have devised a novel union or coupling to hold the tire and fellies against lateral displacement or against separation and at the same time provide for a limited longitudinal movement of the tire when it is contracted. In the outer faces of the fellies we cut a series of elongated grooves or channels $j$, the length of which is greater than the width, and in these grooves or recesses are fitted the keys J, one to each groove or recess. Each key is made somewhat oblong in form, and the thickness of the key closely approximates the width of the grooves or recesses so as to fit snugly therein, but the length of the key is less than the length of the recess, to enable the key to move therein when the tire is contracted. The key is provided with an integral shank or stem $k$ which is passed through, from the inside of the tire, the hole usually made in the tire to receive the bolt, and the end of the stem or shank is headed down against the outside of the tire, in order to rigidly unite the key and tire together.

The operation of our invention, and the advantages thereof, will be readily understood and appreciated by those skilled in the art from the foregoing description taken in connection with the drawings.

Having thus fully described our invention, what we claim as new, and desire to secure by Letters Patent, is—

1. The combination with a felly having the longitudinal slots or grooves $j$ in the periphery thereof, a tire provided with means for tightening the same, and the keys J united to the tire and projecting from the inner face thereof into the slots or grooves $j$, said keys being of less length than the grooves $j$ and the width of the keys being substantially the same as the grooves, whereby the keys are free to have a limited endwise movement in the grooves but the keys and tire are held against sidewise movement on the felly, as and for the purposes described.

2. The combination of a divided felly provided in its outer face with the longitudinal slots or grooves $j$, the tire having its beveled lapped ends across the divided part of the felly and provided with the keys J which fit snugly in the grooves or slots $j$ of the felly, the angle irons E, F, rigid with the ends of the tire, an adjusting bolt fitted in the angle irons and having the ends provided with the set nuts H that bear against the faces of the angle irons next to the ends of the felly-sections, and the sectional boxing I, I', having one plate permanently fastened to the felly and the other plate detachably fastened thereto, said plates being flush with the felly and tire, substantially as and for the purposes described.

In testimony whereof we affix our signatures in presence of two witnesses.

MARTIN L. HOWARD.
GRANT J. GRANDPRE.

Witnesses:
J. NELSON FULFORD,
W. G. KENASTON.